United States Patent
Somekh

(10) Patent No.: US 10,753,908 B2
(45) Date of Patent: Aug. 25, 2020

(54) RESONATOR FOR FORCE DETECTION

(71) Applicant: THE HONG KONG POLYTECHNIC UNIVERSITY, Hong Kong (HK)

(72) Inventor: Michael Somekh, Hong Kong (HK)

(73) Assignee: THE HONG KONG POLYTECHNIC UNIVERSITY, Hong Kong (CN)

(*) Notice: Subject to any disclaimer, the term of this patent is extended or adjusted under 35 U.S.C. 154(b) by 213 days.

(21) Appl. No.: 15/900,871

(22) Filed: Feb. 21, 2018

(65) Prior Publication Data

US 2018/0238833 A1 Aug. 23, 2018

Related U.S. Application Data

(60) Provisional application No. 62/461,962, filed on Feb. 22, 2017.

(51) Int. Cl.
*G01N 29/24* (2006.01)
*G01N 29/42* (2006.01)
(Continued)

(52) U.S. Cl.
CPC ......... *G01N 29/2418* (2013.01); *G01H 13/00* (2013.01); *G01N 21/1702* (2013.01);
(Continued)

(58) Field of Classification Search
CPC .... G01N 29/12; G01N 29/348; G01N 29/036; G01N 2291/014; G01H 13/00
(Continued)

(56) References Cited

U.S. PATENT DOCUMENTS 3,891,302 A * 6/1975 Dabby ............... G02B 6/02066
385/37
4,006,963 A * 2/1977 Baues ................. G02F 1/295
385/37
(Continued)

FOREIGN PATENT DOCUMENTS

WO WO-2011115933 A2 * 9/2011 ............. G01H 9/004

OTHER PUBLICATIONS

Raijibul Islam, Wide-Range in-fiber Fabry-Perot Resonator for Ultrasonic Sensing, IET Optoelectronics, Oct. 2014, 9 pgs (Year: 2014).*

(Continued)

*Primary Examiner* — Clayton E. LaBalle
*Assistant Examiner* — Kevin C Butler
(74) *Attorney, Agent, or Firm* — Spruson & Ferguson (Hong Kong) Limited

(57) ABSTRACT

Provided herein is a resonator for force detection. The resonator comprises a stack of: a cavity containing a cavity medium having a first refractive index; a first diffraction grating having a grating period; and a first covering medium having a second refractive index. Once a resonating condition is satisfied, the cavity allows a plurality of propagating modes for the beam in the cavity and only one propagating mode for the beam outside the cavity. The plurality of propagating modes in the cavity resonates to generate different resonance peaks corresponding different sensitivity levels. By working in different regimes, the resonator is able to provide high sensitivity and large dynamic range for force detection.

20 Claims, 9 Drawing Sheets

(51) Int. Cl.
  *G01N 21/17* (2006.01)
  *G01N 29/036* (2006.01)
  *G01N 29/12* (2006.01)
  *G01N 29/34* (2006.01)
  *G01H 13/00* (2006.01)

(52) U.S. Cl.
  CPC ........... *G01N 29/036* (2013.01); *G01N 29/12* (2013.01); *G01N 29/348* (2013.01); *G01N 29/42* (2013.01); *G01N 2291/014* (2013.01)

(58) Field of Classification Search
  USPC .......................................................... 73/579
  See application file for complete search history.

(56) References Cited

U.S. PATENT DOCUMENTS

| | | | | |
|---|---|---|---|---|
| 4,743,083 | A * | 5/1988 | Schimpe | G02B 6/124 257/E31.065 |
| 5,091,983 | A * | 2/1992 | Lukosz | G01D 5/266 250/231.19 |
| 5,157,537 | A * | 10/1992 | Rosenblatt | G02F 1/01 359/245 |
| 5,337,183 | A * | 8/1994 | Rosenblatt | G02F 1/01 359/245 |
| 5,500,916 | A * | 3/1996 | Cirelli | G02B 6/13 385/37 |
| 6,215,928 | B1 * | 4/2001 | Friesem | G02F 1/025 372/102 |
| 6,982,819 | B2 * | 1/2006 | Sawin | B82Y 20/00 359/245 |
| 7,587,105 | B2 * | 9/2009 | Ashkenazi | A61B 5/0097 385/13 |
| 8,345,349 | B2 * | 1/2013 | Li | G01N 21/62 356/432 |
| 10,258,240 | B1 * | 4/2019 | Eberle | A61B 5/7203 |
| 2001/0046052 | A1 * | 11/2001 | Toida | A61B 5/0097 356/480 |
| 2002/0153805 | A1 * | 10/2002 | Smith | A61B 5/0097 310/311 |
| 2003/0161374 | A1 * | 8/2003 | Lokai | G03F 7/70025 372/57 |
| 2007/0081165 | A1 * | 4/2007 | Kilic | G01H 9/00 356/477 |
| 2008/0034866 | A1 * | 2/2008 | Kilic | G01H 9/004 73/514.26 |
| 2013/0317372 | A1 * | 11/2013 | Eberle | A61B 5/02154 600/478 |
| 2015/0141854 | A1 * | 5/2015 | Eberle | A61B 5/02154 600/488 |
| 2018/0238833 | A1 * | 8/2018 | Somekh | G01N 29/2418 |

OTHER PUBLICATIONS

Bai-Ou Guan, Acoustic and Ultrasonice Detection With Radio-Frequency Encoded Fiber Laser Sensors, IEE Journal of Selected Topics in Quantum Electronics, vol. 23, No. 2, Mar./Apr. 2017, 12 pgs (Year: 2017).*

Connie J. Chang-Hasnain, High-contrast gratings for integrated optoelectronics, Dept. of EE Univ of California Berkley, Jun. 30, 2012, 62 pgs (Year: 2012).*

Gagliardi et al., Interrogation of fiber Bragg-grating resonators by polarization-spectroscopy laser-frequency locking, vol. 15, No. 7 Optics Express, Feb. 2007, 14 pgs (Year: 2007).*

Pierre Pottier et al, Evolution of modes of Fabry-Perot cavity based on photonic crystal guided-mode resonance mirrors, J. Opt. Soc. Am. B / vol. 29, No. 10 / Oct. 2012, 6 pgs (Year: 2012).*

Harikrishn Varu, The optical modelling and design of Fabry Perot Interferometer sensors for ultrasound detection Dissertation, Department of Medical Physics and Bioengineering, University College London, Apr. 2014, 236 pgs (Year: 2014).*

P. Beard at. el., "Transduction mechanisms of the Fabry-Perot polymer film sensing concept for wideband ultrasound detection.," IEEE Trans Ultrason Ferroelectr Freq Control.; vol. 46, No. 6, pp. 1575-1582. doi: 10.1109/58.808883, 1999.

S. Ashkenazi at. el., "Ultrasound detection using polymer microring optical resonator," Applied Physics Letters; vol. 85, No. 22, pp. 5418-5420, 2004.

B. Li at. el., "A transparent broadband ultrasonic detector based on an optical micro-ring resonator for photoacoustic microscopy," Scientific Reports, vol. 4, No. DOI 10.1038/srep04496, p. 4496, 2014.

C. Chang-Hasnain at. el., "High-contrast gratings for integrated optoelectronics," Advances in Optics and Photonics, vol. 4, pp. 379-440, 2012.

V. Karagodsky at. el., "Theoretical analysis of subwavelength high contrast grating reflectors," Optics Express, vol. 18, No. 16, p. 16973, 2010.

R. Magnusson, "Wideband Reflectors with zero-contrast gratings," Optics Letters, vol. 39, No. 15, pp. 4337-4340, 2014.

P. Beard at. el., "Characterisation of a polymer film optical fibre hydrophone for the measurement of ultrasound fields for use in the range 1-30MHz: a comparison with PVDF needle and membrane hydrophones,"IEEE Transactions on Ultrasonics, Ferroelectrics and Frequency Control, vol. 47, No. 1, pp. 256-264, 2000.

E. Zhang, at. el., "Backward-mode multiwavelength photoacoustic scanner using a planar Fabry-Perot polymer film ultrasound sensor for high-resolution three-dimensional imaging of biological tissues," Applied Optics, vol. 47, pp. 561-577, 2008.

C.M. Chow, at. el., "Broadband optical ultrasound sensor with a unique open-cavity structure," J. Biomed. Opt., vol. 16, No. 1, p. 017001, 2011.

D. Rosenblatt, at. el., "Resonant Grating Waveguide Structures," IEEE J. of Quantum Electronics, vol. 33, No. 11, pp. 2038-2059, 1997.

M. G. Moharam, at. el., "Formulation for stable and efficient implementation of the rigorous coupled-wave analysis of binary gratings," Journal Optical Society of America, vol. 12, No. 5, pp. 1068-1076, 1995.

P. Lalanne, at. el., "Optical Properties of Deep Lamellar Gratings:A coupled Bloch-Mode Insight," Journal of Lightwave Technologies, vol. 24, No. 6, pp. 2442-2449, 2006.

* cited by examiner

RESONATOR FOR FORCE DETECTION

CROSS-REFERENCE TO RELATED APPLICATIONS

The present application claims priority to and the benefit of U.S. Provisional Patent Application Ser. No. 62/461,962, entitled FABRY PEROT GRATING RESONATORS FOR ULTRASOUND DETECTION, which was filed on Feb. 22, 2017, and is hereby incorporated by reference in its entity.

TECHNICAL FIELD

The present disclosure generally relates to a resonator for force detection.

BACKGROUND ART

The detection of acoustic waves using optical detection is becoming important because of the considerable improvement in sensitivity and absence of direct electrical contact. The typical examples are Fabry-Perot (FP) resonator and ring resonator.

The FP resonator provides an effective way for optical detection of acoustic waves. The FP resonator involves a layer of polymer sandwiched between one highly reflective metal layer and one partially reflective metal layer. The incident beams of light propagate into the FP resonator and the reflected beams of light are emitted from the FP resonator. As the acoustic waves hit the resonator, the polymer layer deforms under the influence of the waves, thus perturbing the resonant response of the structure. The polymer layer is commonly used because of its elasticity, so that it responds with a large dimensional change for a given imposed pressure. Pressure sensitivities around 200 Pa in 20 MHz bandwidth are reported for FP resonators. Most of the FP resonators use metal reflectors, although there have been other attempts to increase their quality factor by using lossless photonic crystal reflectors, these multilayer structures are still relatively complex.

High sensitivity for acoustic detection has been achieved by the polymer ring resonator, where the sound beam distorts the resonator so that the effective index of the guided mode is perturbed resulting in a change of the resonant wavelength. An impressive sensitivity of noise equivalent pressure of 6.8 Pa in a 140 MHz bandwidth can be provided. Nevertheless, the disadvantages of the ring resonator are that it is hard to provide large scale parallel operation, and its operating dynamic range is limited.

A need therefore exists for a novel resonator with the improved performance to eliminate or diminish the disadvantages and problems described above.

SUMMARY OF THE INVENTION

Provided herein is a resonator for force detection by a beam of electromagnetic radiation. The resonator comprises a stack of: a cavity containing a cavity medium having a first refractive index; a first diffraction grating having a grating period; and a first covering medium having a second refractive index; the cavity, the first diffraction grating and the first covering medium are stacked in an order, and the first refractive index, the second refractive index and the grating period are satisfied with the following resonating condition:

$$\frac{\lambda}{n_r} < p < \frac{\lambda}{n_s}$$

where $\lambda$ is a wavelength of the electromagnetic radiation, p is the grating period, $n_r$ is the first refractive index, and $n_s$ is the second refractive index, such that the cavity allows a plurality of propagating modes for the beam in the cavity and only one propagating mode for the beam outside the cavity.

In certain embodiments, the cavity is between the first diffraction grating and the first covering medium.

In certain embodiments, the first diffraction grating is between the cavity and the first covering medium.

In certain embodiments, the stack further comprises a second diffraction grating; and the cavity is between the first diffraction grating and the second diffraction grating.

In certain embodiments, the stack further comprises a second covering medium; and the second diffraction grating is between the second covering medium and the cavity.

In certain embodiments, the first refractive index is in a range of 1.3 to 2.6, and the second refractive index is in a range of 1 to 1.7.

In certain embodiments, the cavity medium is a first polymer and the covering medium is a second polymer.

In certain embodiments, the wavelength is in the infrared region, the visible light region, or the ultraviolet region.

In certain embodiments, the first diffraction grating has a grating feature comprising the cavity medium and has a spacing comprising the first covering medium.

In certain embodiments, the force detection is for detecting ultrasound.

Provided herein is a system for force detection by a beam of electromagnetic radiation. The system comprises the resonator of the present disclosure; an electromagnetic radiation generator; and an electromagnetic radiation detector.

In certain embodiments, the electromagnetic radiation generator is for generating a beam of electromagnetic radiation having a wavelength in the infrared region, the visible light region, or the ultraviolet region.

In certain embodiments, the wavelength corresponds to a resonance peak of the resonator.

In certain embodiments, the electromagnetic radiation generator is for generating electromagnetic radiation having transverse electric polarization or transverse magnetic polarization.

In certain embodiments, the electromagnetic radiation generator is a tunable laser.

In certain embodiments, the electromagnetic radiation detector comprises a photodiode and a circuit for amplitude detection.

In certain embodiments, the electromagnetic radiation detector comprises a photodiode and a circuit for phase detection.

Provided herein is a method for force detection. The method comprises the steps of: a) generating an incident beam of electromagnetic radiation toward the resonator of the present disclosure; b) detecting a reflected beam or a transmitted beam from the resonator; and c) determining an amount of force acting on the resonator based on the detected beam; the electromagnetic radiation has a wavelength corresponding to a resonance peak of the resonator.

In certain embodiments, the method further comprises the step of selecting the resonance peak from a plurality of resonance peaks of the resonator prior to the step (a).

In certain embodiments, the plurality of resonance peaks are determined by the steps of: scanning the resonator with a plurality of beams of electromagnetic radiation under a plurality of wavelengths; detecting a plurality of beams reflected by or transmitted through the resonator; determining a reflectivity response or a transmissivity response based on the plurality of the detected beams; and determining the plurality of resonance peaks from the reflectivity response or the transmissivity response.

These and other aspects, features and advantages of the present disclosure will become more fully apparent from the following brief description of the drawings, the drawings, the detailed description of certain embodiments and appended claims.

BRIEF DESCRIPTION OF DRAWINGS

The appended drawings contain figures of certain embodiments to further illustrate and clarify the above and other aspects, advantages and features of the present invention. It will be appreciated that these drawings depict embodiments of the invention and are not intended to limit its scope. The invention will be described and explained with additional specificity and detail through the use of the accompanying drawings in which.

DETAILED DESCRIPTION OF THE INVENTION

The present disclosure generally relates to a novel resonator for force detection. The resonator of the present disclosure is lossless and provides modal coupling that greatly enhances the reflectivity at the end faces. The rich responses generated from the resonator provide regions of high and low sensitivities such that by operating in different regimes, high sensitivity and large dynamic range can be achieved for force detection and measurement.

Figure 1:
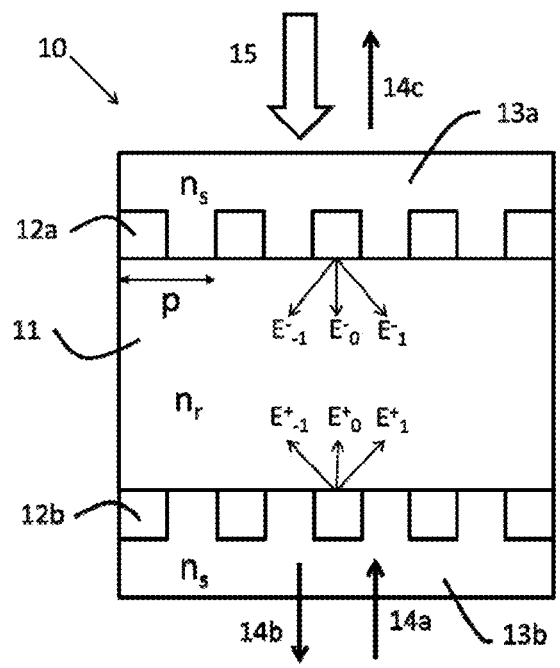
FIG. 1 is a cross-section view of a resonator with two diffraction gratings according to certain embodiments.

FIG. 1 is a cross-section view of a resonator with two diffraction gratings according to certain embodiments. The resonator 10 comprises a cavity 11, two diffraction gratings 12a, 12b, and two covering media 13a, 13b, which are stacked together in a vertical order. The diffraction grating 12a is located on the top of the cavity 11, and the diffraction grating 12b is located on the bottom of the cavity 11. The covering medium 13a covers the diffraction grating 12a, and the covering medium 13b covers the diffraction grating 12b. The cavity 11 contains a cavity medium having a first refractive index $n_r$, and the covering media 13a, 13b have a second refractive index $n_s$. The diffraction gratings 12a, 12b have a grating period p. An incident beam 14a of electromagnetic radiation propagates toward the cavity 11 from the bottom of the cavity 11, and can be, totally or partially, reflected by or transmitted through the cavity 11 such that a reflected beam 14b or a transmitted beam 14c is released from the resonator 10.

The first refractive index $n_r$, the second refractive index $n_s$, the grating period p, the wavelength λ of the incident beam 14a are satisfied with the following resonating condition:

$$\frac{\lambda}{n_r} < p < \frac{\lambda}{n_s} \qquad [1]$$

Once the resonating condition satisfied, the diffraction grating 12a, 12b scatter the incident beam 14a into a plurality of propagating modes (e.g., zero order and ±1 diffraction orders) that resonate in the cavity 11 while there is only one propagating mode that propagates outside the cavity 11. As there are the plurality of propagating modes that resonate in the cavity 11, a plurality of resonance peaks with different line widths under different wavelengths of the incident beam 14a are generated that correspond to different levels of sensitivity for force detection. For instance, a sharp resonance peak at a wavelength provides high sensitivity but only has small maximum signal for measurement, whereas, a wide resonance peak at another wavelength provides low sensitivity but has large maximum signal for measurement. By combining measurements with different resonance peaks, an extended dynamic range can also be provided. As such, the mode conversion at the diffraction gratings 12a, 12b provides richer response behavior compared with the conventional FP resonator.

By selecting a wavelength of a resonance peak matching for certain sensitivity, the incident beam 14a with the selected wavelength is used. When an acoustic wave 15 hits on the resonator 10, the cavity 11 is deformed and the thickness of the cavity 11 is changed, thus perturbing the resonant response of the resonator 10.

As the resonator is required to provide only one mode of beam propagating outside the cavity and more than one mode propagating in the cavity, for normal incidence, some of the diffracted orders should be evanescent or non-propagating. This means the greater the difference between the first refractive index and the second refractive index, the easier it is to satisfy the resonating condition. On the contrary, if the first refractive index and the second refractive index are very close to each other, only a narrow range of grating periods can be used.

Figure 2:
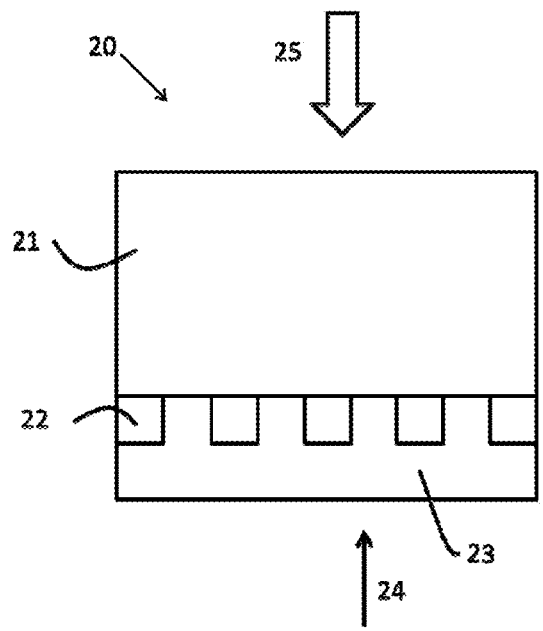
FIG. 2 is a cross-section view of a resonator with one diffraction grating according to certain embodiments.

FIG. 2 is a cross-section view of a resonator with one diffraction grating according to certain embodiments. The resonator 20 comprises a cavity 21, a diffraction grating 22, and a covering medium 23. The diffraction grating 22 is located on the bottom of the cavity 21. The covering medium 23 covers the diffraction grating 22. An incident beam 24 propagates toward the cavity 21 from the bottom of the cavity 21. An acoustic wave 25 can hit on the top of the cavity 21.

Figure 3:
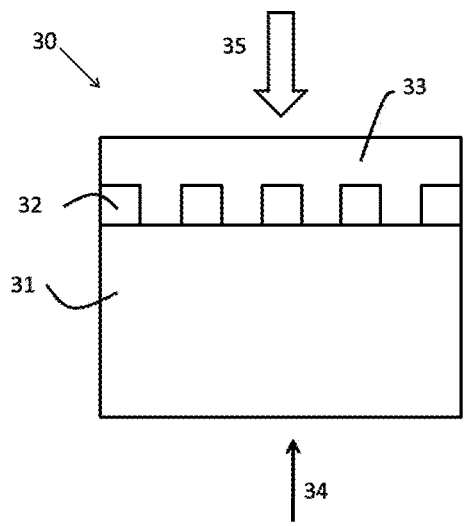
FIG. 3 is a cross-section view of another resonator with one diffraction grating according to certain embodiments.

FIG. 3 is a cross-section view of another resonator with one diffraction grating according to certain embodiments. The resonator 30 comprises a cavity 31, a diffraction grating 32 and a covering medium 33. The diffraction grating 32 is located on the top of the cavity 31. The covering medium 33 covers the diffraction grating 32. An incident beam 34 propagates toward the cavity 21 from the bottom of the cavity 21. An acoustic wave 35 can hit on the covering medium 33.

Figure 4:
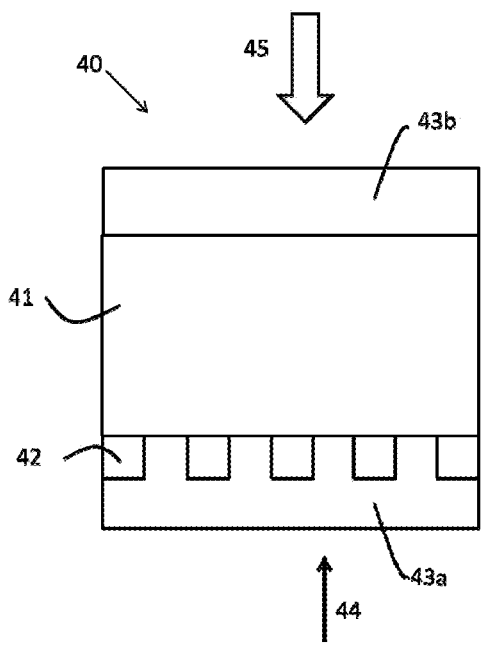
FIG. 4 is a cross-section view of yet another resonator with one diffraction grating according to certain embodiments.

FIG. 4 is a cross-section view of yet another resonator with one diffraction grating according to certain embodiments. The resonator 40 comprises a cavity 41, a diffraction grating 42 and two covering media 43a, 43b. The diffraction grating 42 is located on the bottom of the cavity 41. The covering medium 43a covers the diffraction grating 42. The covering medium 43b is located on the top of the cavity 41. An incident beam 44 propagates toward the cavity 41 from the bottom of the cavity 41. An acoustic wave 45 can hit on the covering medium 43b.

In order to satisfy the resonating condition, the cavity medium is required to have high refractive index. The refractive index of the cavity medium can be higher than 1.56, and more preferably, higher than 1.71. The cavity medium can be compliant polymer so that the dimension of the cavity can be easily changed in response to a force.

In certain embodiments, the cavity medium can comprise a polythiomethacrylate, a polytrithiocarbonate, or a SU8 photoresist. However, other compliant materials with high refractive index can also be used.

On the other hand, the covering medium is required to have low refractive index. The refractive index of the cavity medium should be higher than that of the covering medium by typically at least 15%, preferably at least 20%. The refractive index of the covering medium should be lower than 1.44, and more preferably, lower than 1.31. The covering medium can be a solid, liquid or gas.

In certain embodiments, the covering medium is an amorphous fluoropolymer.

In certain embodiments, the refractive index of the cavity medium is in a range of 1.3 to 2.6 and the refractive index of the covering medium is in a range of 1 to 1.7.

In certain embodiments, the refractive index of the cavity medium is in a range of 1.3 to 1.8 and the refractive index of the covering medium is in a range of 1 to 1.5.

In certain embodiments, the refractive index of the cavity medium is in a range of 1.56 to 1.71 and the refractive index of the covering medium is in a range of 1.31 to 1.44.

In certain embodiments, the refractive index of the cavity medium is 1.7 and the refractive index of the covering medium is 1.33.

The diffraction grating can comprise a dielectric material. Comparing with the conventional FP resonator using metal layer as a reflector, the dielectric diffraction grating does not introduce loss, thus, the resonator in the present disclosure provides no lossy material, and can allow for 100% reflection, 100% transmission and high Q resonance.

The diffraction grating can be formed by nanoimprint lithography. In certain embodiments, the diffraction grating is formed by imprinting the cavity and infilling with the covering medium, so that the grating feature of the diffraction grating is formed from the cavity medium and the spacing of the diffraction grating is formed from the covering medium. However, the diffraction grating can also be made of other materials and under different processes, e.g., chemical vapor deposition and electrochemical deposition.

The grating period should be sufficiently small such that there is only one propagating mode in the outer region and there are two, three or four propagating modes within the cavity.

The mark space ratio of the diffraction grating can work within a large range. In certain embodiments, the mark space ratio is 50:50 that can facilitate the fabrication of the diffraction grating since tiny grating features can be avoided.

The thickness of the cavity can be determined by the acoustic frequency. The thickness should not be greater than half of an acoustic wavelength. For example, considering the sound velocity of 3000 ms$^{-1}$ and a maximum acoustic frequency of 50 MHz, that sets a maximum thickness of the cavity with 30 µm. On the other hand, larger thicknesses can confer greater sensitivity. Thus, for the operating frequencies between 10 MHz and 100 MHz, the thickness of the cavity can be between 10 µm and 100 µm.

Figure 5:
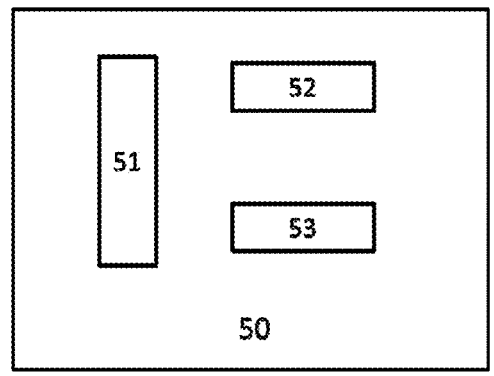
FIG. 5 is a schematic diagram depicting a system for force detection according to certain embodiments.

The present disclosure further provides a system for force detection. FIG. 5 is a schematic diagram depicting a system for force detection according to certain embodiments. The system 50 comprises a resonator 51 of the present disclosure, an electromagnetic radiation generator 52, and an electromagnetic radiation detector 53. The electromagnetic radiation generator 52 is used for generating a beam of electromagnetic radiation, which propagates toward the resonator 51. The electromagnetic radiation detector 53 is used for detecting the electromagnetic radiation reflected by or transmitted through the resonator 51.

The electromagnetic radiation generator can be a laser, and preferably, a tunable laser. The wavelength of the generated electromagnetic radiation can be within the infrared region (i.e., from about 700 nm to 1 mm), visible light region (i.e., from about 400 nm to 700 nm), or ultraviolet region (i.e., from about 10 nm to 400 nm), and preferably, the infrared region.

In certain embodiments, the wavelength is in a range of 1.4 µm to 1.7 µm.

In certain embodiments, the wavelength of the generated electromagnetic radiation is 1.5 µm so that after satisfying the resonating condition, the diffraction grating with larger grating period compared to visible wavelengths can still be used.

The generated electromagnetic radiation can be in transverse electric polarization or transverse magnetic polarization.

In certain embodiments, the system comprises two or more electromagnetic radiation generators. Each electromagnetic radiation generator generates electromagnetic radiation with a wavelength corresponding to a sensitivity level.

The electromagnetic radiation detector can be a photodetector, for example, a photodetector comprising InGaAs photodiode and integrated amplifiers.

Figure 6:
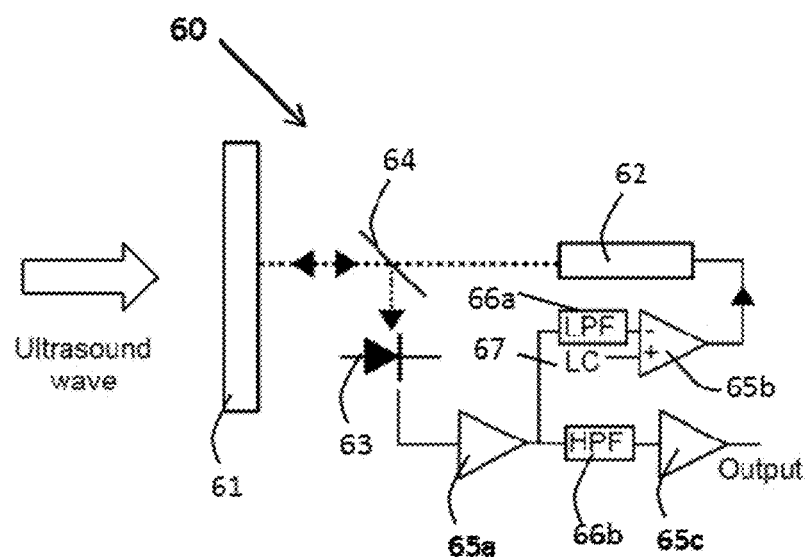
FIG. 6 is a schematic diagram depicting a system for ultrasound detection by amplitude detection according to certain embodiments.

FIG. 6 is a schematic diagram depicting a system for ultrasound detection by amplitude detection according to certain embodiments. The system 60 comprises a resonator 61 of the present disclosure, a tunable laser 62, a photodetector 63, a beam splitter 64, amplifiers 65a, 65b, 65c, a low pass filter 66a, a high pass filter 66b, and a level controller 67.

The tunable laser 62 generates an incident beam, which propagates toward the resonator 61. The wavelength of the incident beam can be tuned at first till reaching to the resonance of interest. The beam splitter 64 reflects the reflected beam from the resonator 61 towards the photodetector 63. The optical signal detected by the photodetector 63 is amplified by the amplifier 65a and split into two arms. One, passing through the low pass filter 66a, is low pass filtered so that only the average signal level is detected, and this signal is compared by the amplifier 65b with a predefined level from the level control 67 and a correction is made to the wavelength control of the tunable laser 62. This ensures that the wavelength of the incident beam stays locked to the desired resonance. The rest of the signal, passing through the high pass filter 66b, is high pass filtered and further amplified by the amplifier 65c. The variation of this signal corresponds to the changes around the mean position which is the output corresponding to the presence of the ultrasound wave acting on the resonator 61.

Figure 7:
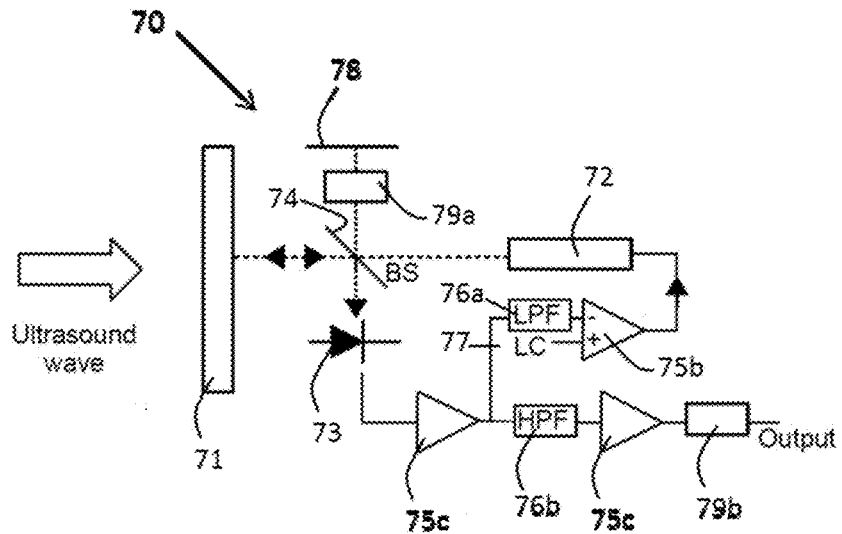
FIG. 7 is a schematic diagram depicting a system for ultrasound force detection by phase detection according to certain embodiments.

FIG. 7 is a schematic diagram depicting a system for ultrasound detection by phase detection according to certain embodiments. The system 70 comprises a resonator 71 of the present disclosure, a tunable laser 72, a photodetector 73, a beam splitter 74, amplifiers 75a, 75b, 75c, a low pass filter 76a, a high pass filter 76b, a level controller 77, a mirror 78, an acoustic-optic modulator 79a, and demodulator 79b.

The system 70 operates in a similar way to the system 60 of FIG. 6 except that the system 70 uses phase detection. The system is shown with an extra arm providing interferometry. By shifting the frequency with the acousto-optic modulator 79a, there is an interference signal produced at the frequency imposed by the acousto-optic modulator 79a. The ultrasound wave introduces a time varying phase shift on the reflected light which phase modulates the interference signal at the ultrasonic frequency. This can be detected using standard radio frequency demodulation processes as depicted in FIG. 7. The phase detection can provide higher sensitivity than the amplitude detection.

An alternative approach for detecting ultrasound wave is to send two orthogonal polarizations to the resonator, one polarization is on the resonance of interest and the other is on off resonance. The effect of this is that the off resonance reflection acts at the reference beam. The advantage of this approach is that the reflection is less susceptible to mechanical vibration.

In certain embodiments, the system further comprises a processor configured to select a resonance peak from a plurality of resonance peaks of the resonator based on a sensitivity level required, and lock the electromagnetic radiation generator to generate a beam of electromagnetic radiation having a wavelength corresponding to the selected resonance peak.

Figure 8A:
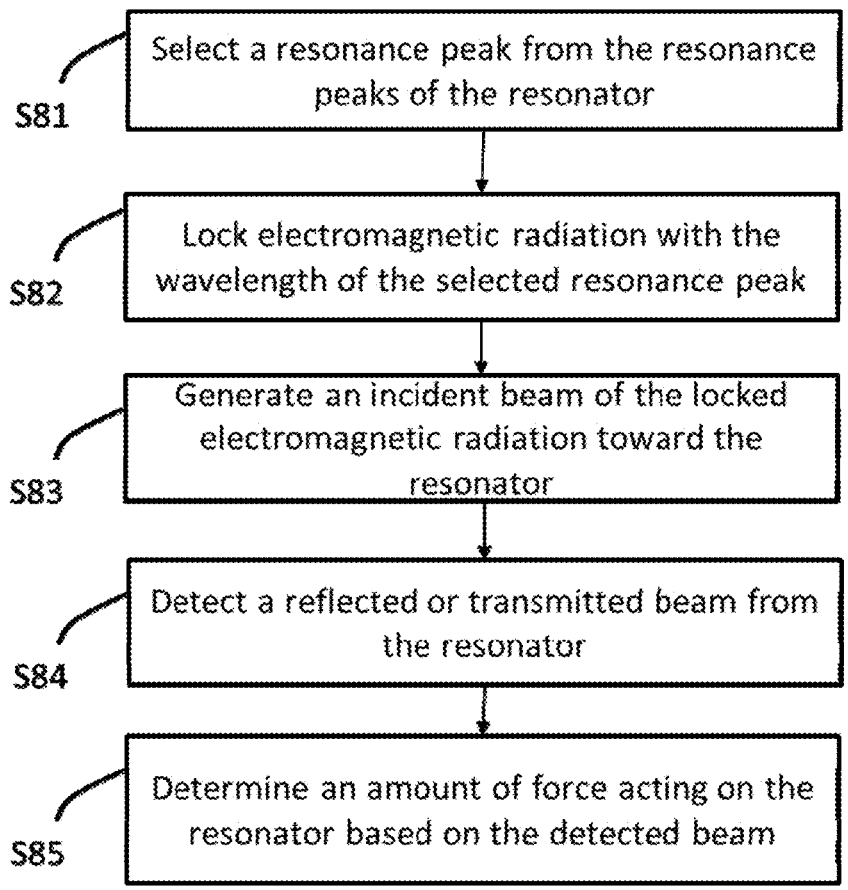
FIG. 8A is a flow chart depicting a method for force detection according to certain embodiments.

The present disclosure further provides a method for force detection. FIG. 8A is a flow chart depicting a method for force detection according to certain embodiments. In step S81, a resonance peak is selected from a plurality of resonance peaks of the resonator of the present disclosure based on a sensitivity level required for the force detection. In step S82, the electromagnetic radiation is locked with the wavelength of the selected resonance peak. In step S83, an incident beam of the locked electromagnetic radiation is generated towards the resonator. In step S84, a reflected beam or a transmitted beam from the resonator is detected. In step S85, an amount of force acting on the resonator is determined based on the detected beam.

Figure 8B:
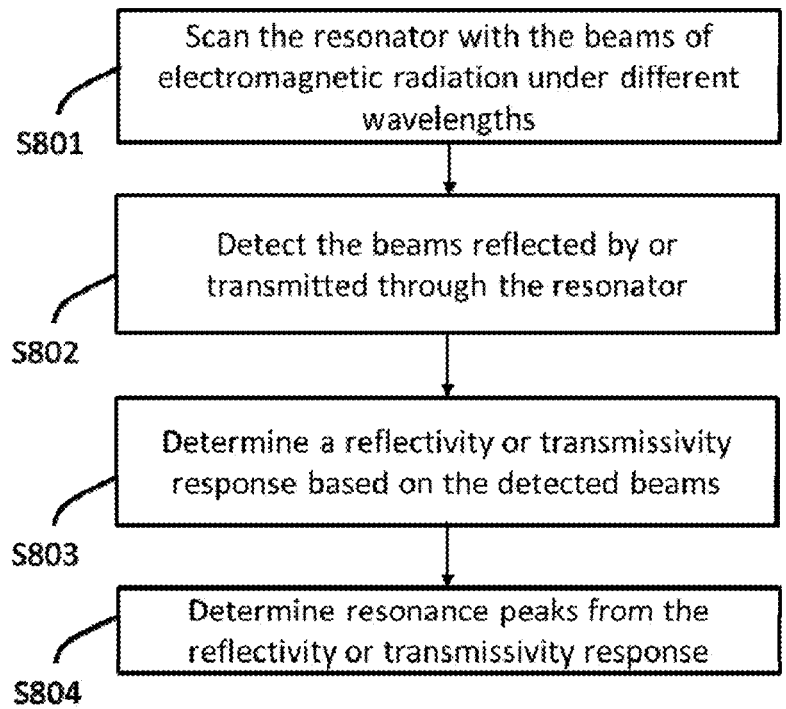
FIG. 8B is a flow chart depicting a method for determining a plurality of resonance peaks of a resonator according to certain embodiments.

FIG. 8B is a flow chart depicting a method for determining the plurality of resonance peaks of the resonator according to certain embodiments. In step S801, the resonator is scanned with the beams of electromagnetic radiation under different wavelengths. In step S802, the beams reflected by or transmitted through the resonator are detected. In step S803, a reflectivity response or a transmissivity response is determined based on the detected beams. In step S804, the plurality of resonance peaks are determined from the reflectivity response or the transmissivity response.

Computational simulation was conducted for the resonator of the present disclosure according to certain embodiments, and the corresponding simulation results are shown as follows:

Referring to the resonator depicted in FIG. 1, in order to obtain the enhanced response behavior, it is required to have two or more distinct modes in the cavity. In this case, zero order and the +1 and −1 diffraction orders which have the same k-vector in the z-direction, the second order diffracted beams are thus evanescent. Outside the resonator, only the zero order propagates. These conditions may be summarized as follows:

$$k_g > \frac{2\pi n_s}{\lambda} \text{ and } \frac{2\pi n_r}{\lambda} > k_g > \frac{\pi n_r}{\lambda} \quad [2]$$

where $n_s$ are $n_r$ are the refractive indices of the covering medium and the cavity medium respectively, $\Delta$ is the wavelength of electromagnetic radiation, and $k_g$ is the grating vector $$\frac{2\pi}{p}.$$

The first inequality only has an effect when the refractive index of the cavity medium is more than twice that of the covering medium.

The field propagating in the positive z-direction inside the resonator is represented as $E^+$, which is a 3×1 matrix representing the propagating modes only. The propagation of the evanescent waves is completely neglected. Similarly, the waves propagating in the negative z-direction is represented as $E^-$. A 3×3 propagation matrix $[\phi]$ is defined, which is zero apart from the diagonals which give the phase delays of the different diffracted orders and another 3×3 matrix $[\Psi]$ which allows one to shift the grating on the transmission side with respect the grating on the incident side without lengthy calculation.

$$[\phi] = \begin{pmatrix} \exp ik_z h & 0 & 0 \\ 0 & \exp i\frac{2\pi n_r}{\lambda}h & 0 \\ 0 & 0 & \exp ik_z h \end{pmatrix}$$

where $$k_z = \sqrt{\left(\frac{2\pi n_r}{\lambda}\right)^2 - k_g^2}$$

and h is the thickness of the resonator.
Similarly, $$[\Psi] = \begin{pmatrix} \exp{-i\psi} & 0 & 0 \\ 0 & 1 & 0 \\ 0 & 0 & \exp{i\psi} \end{pmatrix}$$

where ψ is the phase shift between the gratings on each surface.

The reflectivity (ref) and transmissivity (trans) are written as:

$$\text{ref} = r_{01} + t_{10}\phi E^- \quad [3]$$

$$\text{trans} = t_{12}\psi\phi E^+ \quad [4]$$

Where the subscripts for the transmission t, refer to the input and output media respectively. For the reflection coefficients, the first subscript also refers to the input medium and the second subscript refers to the reflecting medium.

A relationship between $E^+$ and $E^-$ is obtained as follows:

$$E^- = \psi^* r_{12} \psi \phi E^+ \quad [5]$$

$$E^+ = t_{01} + r_{10}\phi E^- \quad [6]$$

substituting [5] into [6] gives $$E^+ = A^{-1} t_{01} \quad [7]$$

where $A = I - r_{10}\phi\psi^* r_{12}\psi\phi$

Explicit expressions for the reflection and transmission coefficients are written as below.

$$\text{trans} = t_{12}\psi\phi A^{-1} t_{01} \quad [8]$$

$$\text{ref} = r_{01} + t_{10}\phi\psi^* r_{12}\psi\phi A^{-1} t_{01} \quad [9]$$

In order to calculate the values of r and t, rigorous coupled wave analysis (RCWA) is used to calculate the scattering from a single isolated grating, and it is required to calculate this for the light incident from the covering media and light incident from inside the resonator. For the waves incident from the resonator medium, waves incident at angles corresponding to the 1$^{st}$ order diffracted waves are considered. $r_{01}$ is a 1×1 scalar, $r_{10}$ and $r_{12}$ are 3×3 matrix, $t_{10}$ is 1×3, and $t_{01}$ is 3×1. All other matrices are 3×3. When the grating phase differs by is either 0 or π, the values of the positive and negative diffracted orders are the same so the calculations can be further simplified to 2×2 matrices, but to retain arbitrarily displaced gratings where the two diffracted orders will generally not be equal the 3×3 formulation is required.

The evanescent waves are ignored as mentioned above, however, they are included in the calculation of the r and t values in the RCWA calculation, and their inclusion is necessary to satisfy the boundary conditions and does affect the values of the propagating orders. These modes, however, simply decay within the depth of the resonator and do not need to be included as they do not reach the opposite reflector. Indeed comparison with RCWA shows that within the region of validity satisfying the inequalities of eq. 2 the results agree with RCWA.

Figure 9:
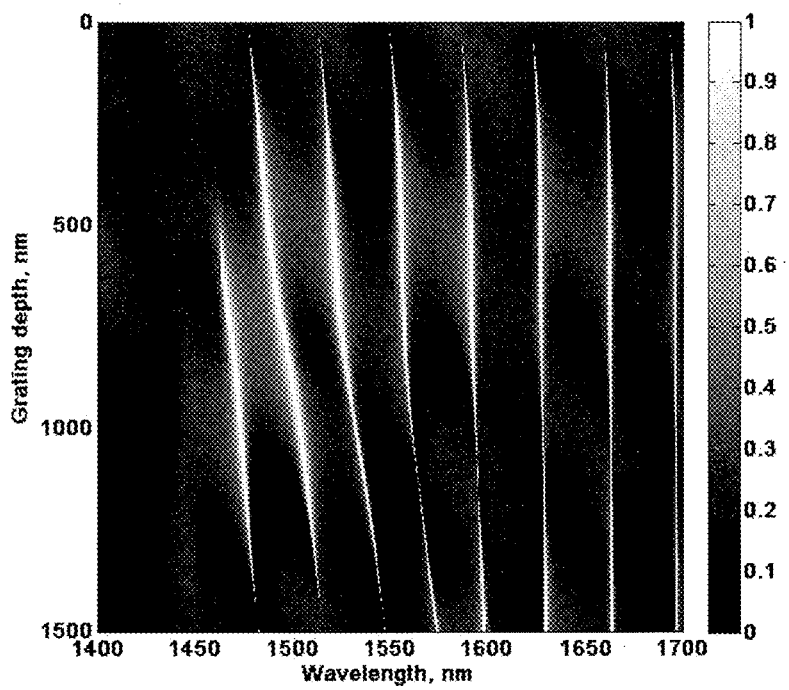
FIG. 9 shows the modulus of reflection coefficient simulated as a function of grating depth and input wavelength for transverse electric (TE) input polarization with a single grating on a reflection side according to an embodiment.
Figure 10:
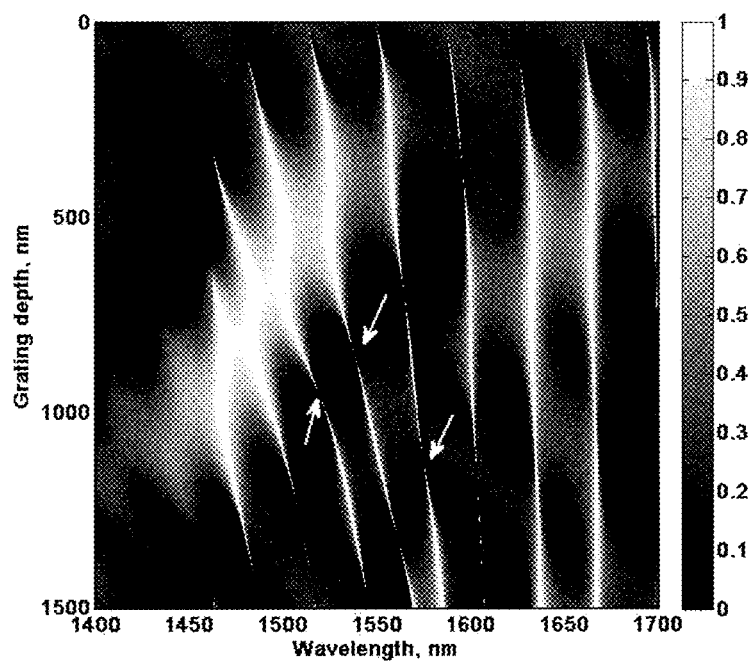
FIG. 10 shows the modulus of reflection coefficient simulated with the same parameters as those for FIG. 9 except that two gratings are on both sides of the resonator.

FIG. 9 shows the reflection coefficients for TE modes calculated for a structure with a single grating with parameters: the grating period is 1.1 μm, the resonator thickness is 10 μm, the refractive index of covering medium is 1.33, the refractive index of cavity medium is 1.7. FIG. 10 shows the responses for a double grating structure. The high brightness in the graphs represents high reflectivity. In both cases, the thickness of the grating is 10 μm. These plots are not valid for wavelengths less than 1.463 μm because under these conditions, more than one wave propagates outside the grating. Compared with a normal FP, both resonators from FIGS. 9 and 10 exhibit complex behaviors with regions of high reflectivity and regions of low reflectivity. The double grating structure shows more varied behavior compared with the single grating structure with many regions where mode hybridization is apparent e.g., the regions indicated by the arrows. The difference in behavior is not simply that the amount of scattering is greater in the case of two gratings. It can also be seen that the extent of the regions where the reflectivity is close to one is much greater in the case of the double grating structure.

Figure 11:
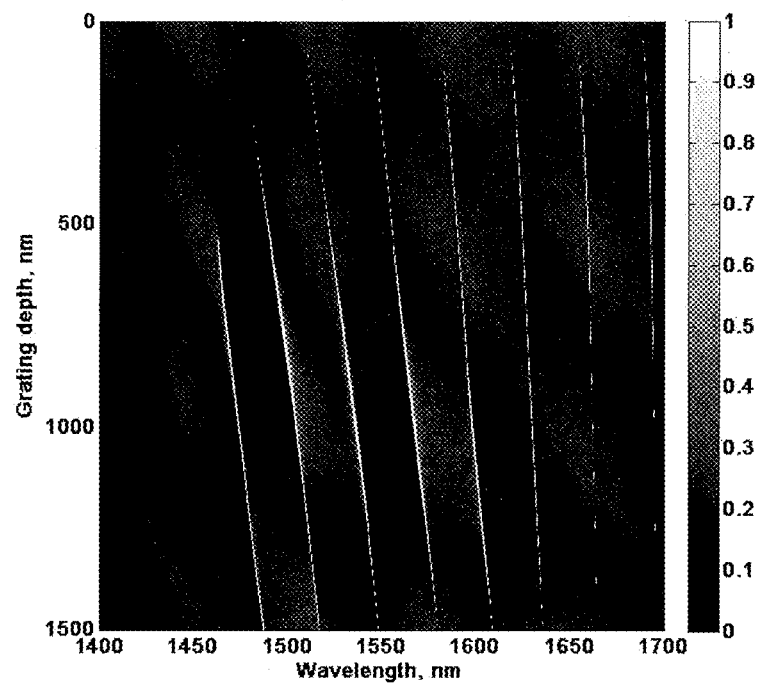
FIG. 11 shows the modulus of reflection coefficient simulated with the same parameters as those for FIG. 9 except that the input polarization is transverse magnetic (TM)
Figure 12:
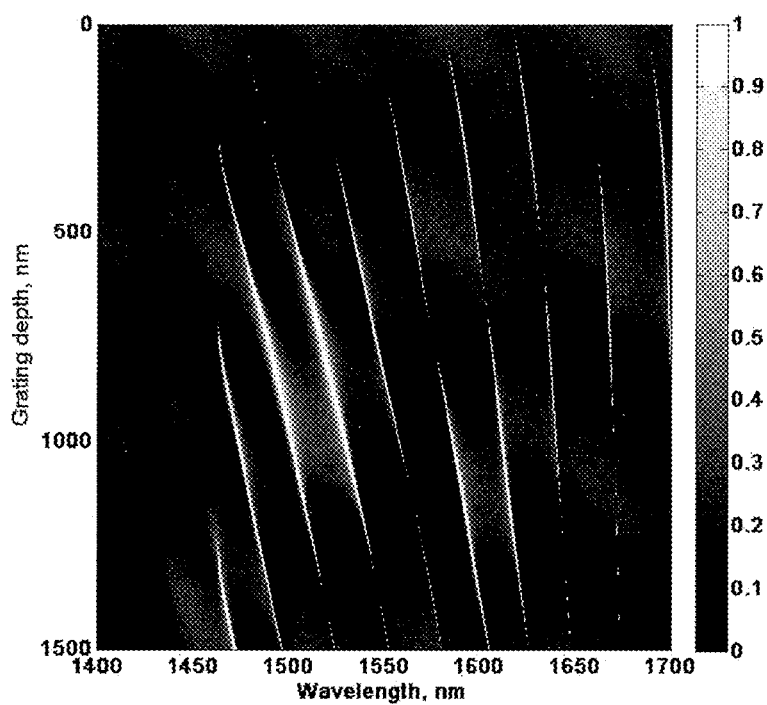
FIG. 12 shows the modulus of reflection coefficient simulated with the same parameters as those for FIG. 9 except that the input polarization is TM and two gratings are on both sides of the resonator.

FIGS. 11 and 12 show reflectivity for the single grating structure and the double grating structure for TM mode. As compared, the extent of the regions with high reflectivity in the TM cases is lower than that of the TE cases.

Figure 13:
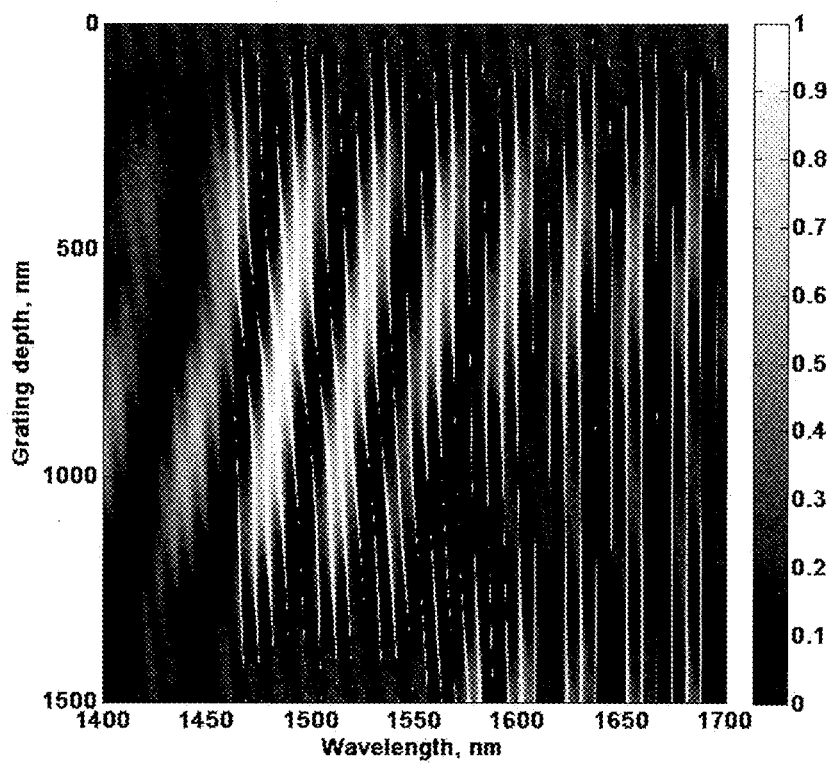
FIG. 13 shows the modulus of reflection coefficient simulated with the same parameters as those for FIG. 9 except that two gratings are on both sides of the resonator and the resonator thickness is 50 μm.

The double grating structure is further investigated in more detail as an ultrasonic detector. FIG. 13 shows the reflectivity profile for a resonator having a thickness of 50 μm. When the resonator has this thickness, its behavior is even richer compared with the 10 μm resonator as shown in FIGS. 9 and 10. Moreover, this thickness offers the potential for greater ultrasonic sensitivity and allows for direct comparison with the conventional FP resonator.

Figure 14:
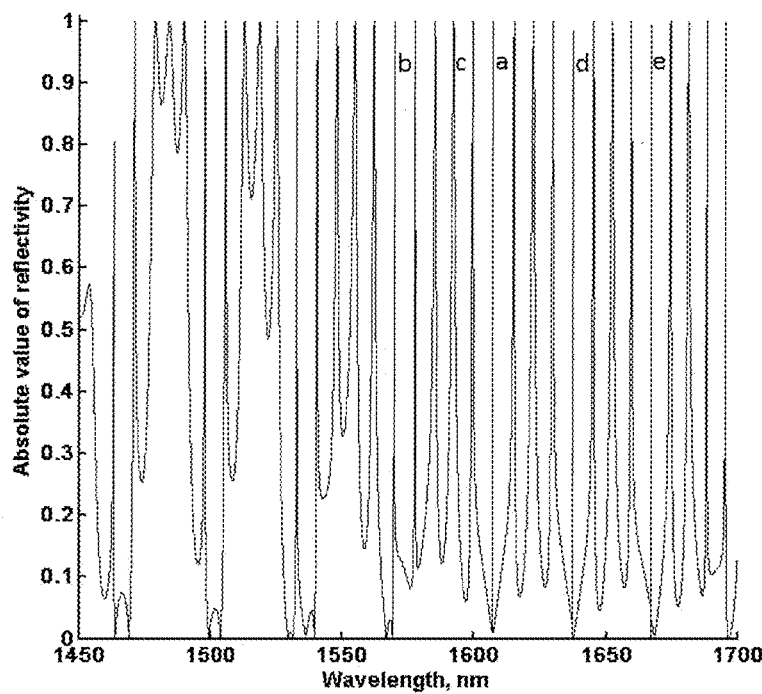
FIG. 14 shows a reflectivity response versus wavelengths taken at a grating depth of 840 nm according to an embodiment.

In order to investigate the sensitivity, selected peaks obtained at 840 nm grating depth for TE incident polarization are studied. FIG. 14 shows the reflection as a function of incident wavelength. There is a considerable richness of structure, and three regions marked with 'a', b', and 'c' in FIG. 14 are further studied. The responsivities to the displacement of 0.1 nm with respect to the three regions are shown in FIGS. 15A, 15B, and 15C respectively.

Figure 15A:
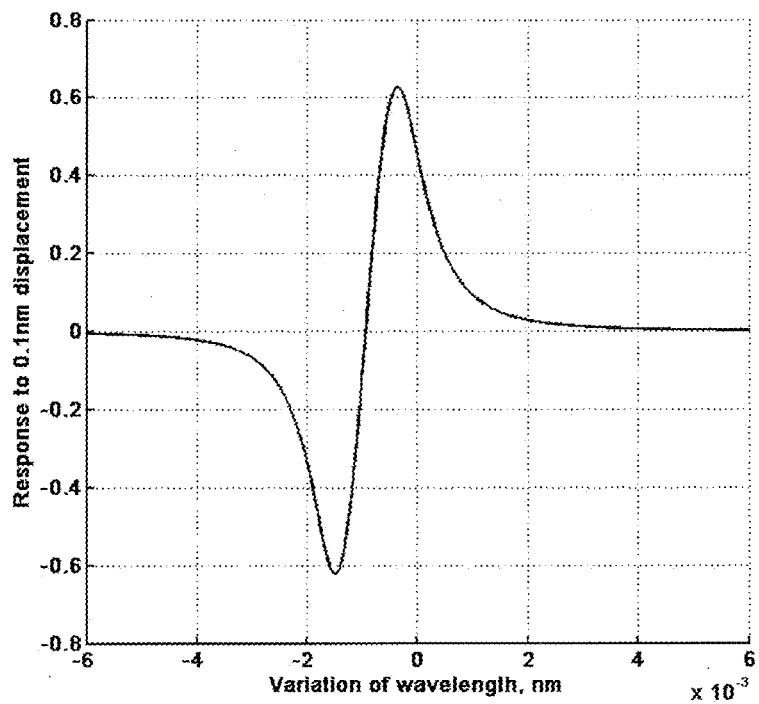
FIG. 15A shows a responsivity to displacement for around the peak 'a' at 1607.3 nm in FIG. 14.

The response of FIG. 15A is calculated around the peak 'a' at 1607.3 nm. As the resonance is so sharp, deviations from the resonance peak are shown rather than the actual wavelength. As shown in FIG. 15A, the peak response is around 0.6, thus, the sensitivity is approximately 150 times higher than the conventional FP with 10 nm gold layer or approximately 75 times more sensitive compared with the FP with a 15 nm gold layer. The maximum measureable signal for such resonator will be much less than the conventional FP. The peaks 'd' and 'e' also provide with the similar performance to the peak 'a'.

Figure 15B:
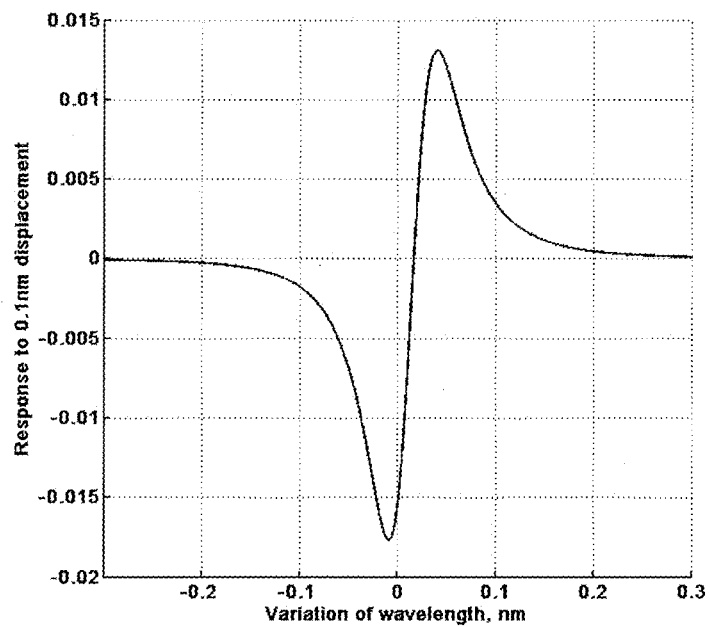
FIG. 15B shows a responsivity to displacement for around the peak 'b' at 1569.5 nm in FIG. 14.

As shown in FIG. 15B, the response around the peak 'b' has a sensitivity about a factor of two better than the conventional FP with the 15 nm layer. There is slight difference in sensitivity either side of the resonant peak due to asymmetry in that peak. The peak 'b' and the like thus confer similar sensitivity and dynamic range as the conventional FP.

Figure 15C:
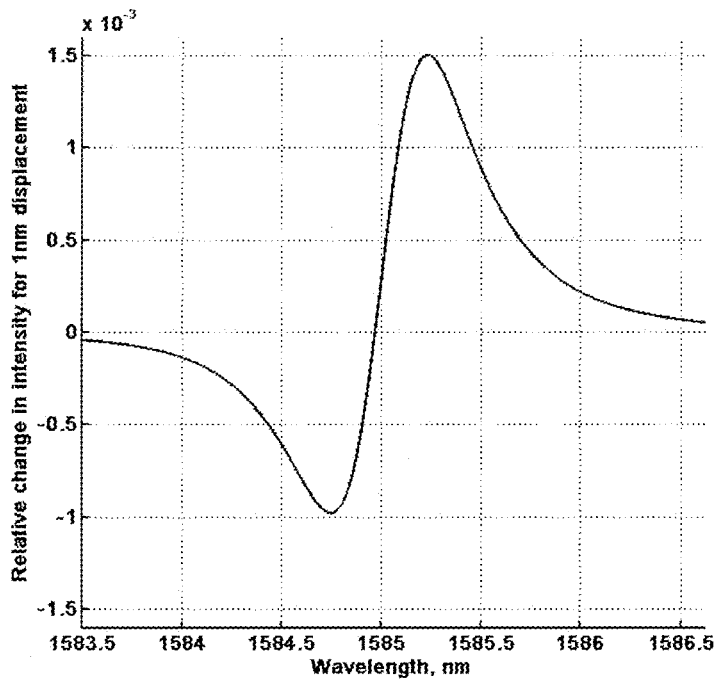
FIG. 15C shows a responsivity to displacement for around the peak 'c' at 1585 nm in FIG. 14.

As shown in FIG. 15C, the response around the peak 'c' has a sensitivity about 5 times less than the conventional FP, but it provides larger dynamic range. Thus, by varying the operating frequency, the system of the present disclosure can operate at high sensitivity and large dynamic range.

The resonator of the present disclosure can provide higher sensitivity compared to the conventional FP resonator. At the same time, by tuning the operating frequency, different sensitivity regimes may be accessed that enlarges the operating dynamic range.

The resonator in the present disclosure is applicable but no limited to an acoustic sensor, an ultrasound sensor, optoelectronic devices, and biosensing devices. The force measured by the resonator in the present disclosure can be but not limited to a dynamic mechanical force with high frequency, an acoustic force, and an ultrasonic force.

Although the invention has been described in terms of certain embodiments, other embodiments apparent to those of ordinary skill in the art are also within the scope of this invention. Accordingly, the scope of the invention is intended to be defined only by the claims which follow.

What is claimed is:

1. A resonator for force detection by a beam of electromagnetic radiation, the resonator comprising a stack of:
   a cavity containing a cavity medium having a first refractive index;
   a first diffraction grating having a grating period; and
   a first covering medium having a second refractive index;
   wherein the cavity, the first diffraction grating and the first covering medium are stacked in an order, and the first refractive index, the second refractive index and the grating period are satisfied with the following resonating condition:

$$\frac{\lambda}{n_r} < p < \frac{\lambda}{n_s}$$

where λ is a wavelength of the electromagnetic radiation, p is the grating period, $n_r$ is the first refractive index, and $n_s$ is the second refractive index,
   such that the cavity allows a plurality of propagating modes for the beam in the cavity and only one propagating mode for the beam outside the cavity, the plurality of propagating modes resonating in the cavity thereby generating a plurality of resonance peaks with different line widths under different wavelengths of the beam.

2. The resonator of claim 1, wherein the cavity is between the first diffraction grating and the first covering medium.

3. The resonator of claim 1, wherein the first diffraction grating is between the cavity and the first covering medium.

4. The resonator of claim 3, wherein the stack further comprises a second diffraction grating; and the cavity is between the first diffraction grating and the second diffraction grating.

5. The resonator of claim 4, wherein the stack further comprises a second covering medium; and the second diffraction grating is between the second covering medium and the cavity.

6. The resonator of claim 1, wherein the first refractive index is in a range of 1.3 to 2.6, and the second refractive index is in a range of 1 to 1.7.

7. The resonator of claim 1, wherein the cavity medium is a first polymer and the first covering medium is a second polymer.

8. The resonator of claim 1, wherein the wavelength is in the infrared region, the visible light region, or the ultraviolet region.

9. The resonator of claim 1, wherein the first diffraction grating has a grating feature comprising the cavity medium and has a spacing comprising the first covering medium.

10. The resonator of claim 1, wherein the force detection is for detecting ultrasound.

11. A system for force detection, the system comprising:
    the resonator of claim 1;
    an electromagnetic radiation generator; and
    an electromagnetic radiation detector.

12. The system of claim 11, wherein the electromagnetic radiation generator is for generating a beam of electromagnetic radiation having a wavelength in the infrared region, the visible light region, or the ultraviolet region.

13. The system of claim 12, wherein the wavelength corresponds to a resonance peak of the resonator.

14. The system of claim 11, wherein the electromagnetic radiation generator is for generating electromagnetic radiation having transverse electric polarization or transverse magnetic polarization.

15. The system of claim 11, wherein the electromagnetic radiation generator is a tunable laser.

16. The system of claim 11, wherein the electromagnetic radiation detector comprises a photodiode and a circuit for amplitude detection.

17. The system of claim 11, wherein the electromagnetic radiation detector comprises a photodiode and a circuit for phase detection.

18. A method for force detection by using the resonator of claim 1, the method comprising the steps of:
    a) generating an incident beam of electromagnetic radiation toward the resonator;
    b) providing force acting on the resonator;
    c) detecting a reflected beam or a transmitted beam from the resonator; and
    d) determining an amount of the force acting on the resonator based on the detected beam;
    wherein the electromagnetic radiation has a wavelength corresponding to a resonance peak of the resonator.

19. The method of claim 18 further comprising the step of selecting the resonance peak from a plurality of resonance peaks of the resonator prior to the step (a).

20. The method of claim 19, wherein the plurality of resonance peaks are determined by the steps of:
    scanning the resonator with a plurality of beams of electromagnetic radiation under a plurality of wavelengths;
    detecting a plurality of beams reflected by or transmitted through the resonator;
    determining a reflectivity response or a transmissivity response based on the plurality of the detected beams; and
    determining the plurality of resonance peaks from the reflectivity response or the transmissivity response.

* * * * *